US008612066B2

(12) United States Patent
O'Neal

(10) Patent No.: US 8,612,066 B2
(45) Date of Patent: Dec. 17, 2013

(54) CONTROL SYSTEM FOR PAYLOAD LIMITING OF HAULING OPERATION

(75) Inventor: Steven Wayne O'Neal, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 1012 days.

(21) Appl. No.: 12/057,895

(22) Filed: Mar. 28, 2008

(65) Prior Publication Data
US 2009/0248221 A1  Oct. 1, 2009

(51) Int. Cl.
*G05D 1/00* (2006.01)
*G05D 3/00* (2006.01)
*G06G 7/48* (2006.01)
*G06F 7/00* (2006.01)
*G06F 17/00* (2006.01)

(52) U.S. Cl.
USPC ............... 701/2; 701/1; 703/8; 318/580

(58) Field of Classification Search
USPC .................. 701/1–2; 703/8; 318/580
See application file for complete search history.

(56) References Cited

U.S. PATENT DOCUMENTS

| 4,529,961 A | | 7/1985 | Nishimura et al. |
| 4,567,460 A | * | 1/1986 | Gebler .................... 340/442 |
| 4,909,074 A | * | 3/1990 | Gerresheim et al. ........ 73/146.4 |
| 5,070,959 A | | 12/1991 | Grabowski |
| 5,182,712 A | | 1/1993 | Kyrtsos et al. |
| 5,325,902 A | * | 7/1994 | Loewe et al. ............... 152/419 |
| 5,327,347 A | | 7/1994 | Hagenbuch |
| 5,446,452 A | * | 8/1995 | Litton ...................... 340/870.17 |
| 5,537,090 A | * | 7/1996 | Thomas et al. ............... 340/443 |
| 5,583,765 A | * | 12/1996 | Kleehammer ................... 701/1 |
| 5,631,832 A | | 5/1997 | Hagenbuch |
| 5,736,939 A | | 4/1998 | Corcoran |
| 5,787,374 A | * | 7/1998 | Ferguson et al. .............. 701/41 |
| 5,827,957 A | * | 10/1998 | Wehinger ..................... 73/146.3 |
| 6,044,313 A | | 3/2000 | Gannon |
| 6,092,028 A | * | 7/2000 | Naito et al. ..................... 702/47 |
| 6,426,694 B1 | * | 7/2002 | Larson ......................... 340/441 |
| 6,499,343 B1 | * | 12/2002 | Haas et al. ....................... 73/146 |
| 6,671,609 B2 | * | 12/2003 | Nantz et al. ..................... 701/93 |

(Continued)

FOREIGN PATENT DOCUMENTS

EP  1190885 A2  9/2001
EP  1801551 A2  6/2007

OTHER PUBLICATIONS http://www.erosioncontrol.com/gx_0011_modern.html, Modern Tire Management, Grading and Excavation Contractor, 2001, pp. 1-12.

(Continued)

*Primary Examiner* — James Trammell
*Assistant Examiner* — Majdi Alsomiri
(74) *Attorney, Agent, or Firm* — Finnegan, Henderson, Farabow, Garrett & Dunner LLP

(57) ABSTRACT

In one aspect, the present disclosure is directed to a control system for a machine with traction devices. The control system may have a sensor configured to sense an ambient temperature. The control system may also have a controller in communication with the sensor. The controller may be configured to determine a load limit of a machine based on an expected speed of the machine and the ambient temperature. The controller may further be configured to enforce the load limit of the machine during loading.

20 Claims, 3 Drawing Sheets

(56) References Cited

U.S. PATENT DOCUMENTS

| | | | |
|---|---|---|---|
| 6,721,680 B2 | 4/2004 | Sorrells et al. | |
| 6,842,680 B2 | 1/2005 | Doddek et al. | |
| 6,868,358 B2 | 3/2005 | Brown, Jr. | |
| 6,965,306 B2* | 11/2005 | Tsujita et al. | 340/448 |
| 7,075,421 B1 | 7/2006 | Tuttle | |
| 7,161,476 B2* | 1/2007 | Hardman et al. | 340/442 |
| 7,197,422 B2* | 3/2007 | Gaunt et al. | 702/138 |
| 7,461,713 B2* | 12/2008 | Kojima | 180/170 |
| 7,706,930 B2* | 4/2010 | Corniot | 701/1 |
| 2002/0019685 A1* | 2/2002 | Ries-Mueller | 701/1 |
| 2003/0220729 A1 | 11/2003 | Doddek et al. | |
| 2004/0145457 A1* | 7/2004 | Schofield et al. | 340/425.5 |
| 2004/0178005 A1 | 9/2004 | Carlstrom et al. | |
| 2005/0167164 A1 | 8/2005 | Takeda | |
| 2005/0235744 A1* | 10/2005 | Ogawa | 73/146 |
| 2006/0025895 A1 | 2/2006 | Jansson | |
| 2006/0152352 A1* | 7/2006 | Moughler | 340/438 |
| 2007/0132567 A1* | 6/2007 | Schofield et al. | 340/438 |
| 2007/0135137 A1 | 6/2007 | Olson | |
| 2008/0042817 A1* | 2/2008 | Fogelstrom | 340/442 |
| 2008/0059411 A1* | 3/2008 | Greiner et al. | 707/2 |
| 2008/0082345 A1* | 4/2008 | Greiner et al. | 705/1 |
| 2008/0180523 A1* | 7/2008 | Stratton et al. | 348/114 |
| 2008/0314658 A1* | 12/2008 | Atarashi et al. | 180/65.2 |

OTHER PUBLICATIONS http://www.goodyear.com/media/pr/pr_2000/22169oh.html, Goodyear's New Temperature Prediction Model Improves on Current TKPH/TMPH Formula, Oct. 9, 2000, pp. 1 of 1.

Preliminary New 724J-844J Tire Pressure Monitoring Option Bulletin, John Deere, Mar. 1, 2007, 2 pages.

U.S. Appl. No. 11/998,413, filed Nov. 30, 2007, "Payload Control System based on Force and Speed," pp. 1-13, Figs. 1-3.

Office Action from U.S. Appl. No. 11/998,413 mailed on Mar. 7, 2011 (6 pages).

* cited by examiner

CONTROL SYSTEM FOR PAYLOAD LIMITING OF HAULING OPERATION

TECHNICAL FIELD

The present disclosure relates generally to a control system for a hauling operation and, more particularly, to a control system for a hauling operation that modifies a payload limit of a machine.

BACKGROUND

A number of industries, such as the mining industry, rely on large mobile machines (e.g., off-road haul trucks and wheel loaders) to transport cargo loads. The loads can be very large, and the machines are often operated around the clock. As the mobile machine travels, tires of the mobile machine generate heat due to friction with the road surface.

One way to quantify the heat generation of a tire is by calculating the tire's ton-miles-per-hour (TMPH) or ton-kilometers-per-hour (TKPH). A tire's TMPH may be proportional to the product of, for example, the weight of a payload of the mobile machine F and a speed of the mobile machine S:

$$TMPH \propto F \cdot S \quad (1)$$

High TMPH values can indicate excessive amounts of heat generation, and excessive heat generation can lead to accelerated wear and failure of the mobile machine's tires. Due to the large cost of replacing tires, it is desirable to keep the tire's TMPH generally below a predetermined value.

One approach to limiting heat generation in mobile machine tires is disclosed in U.S. Pat. No. 5,631,832 (the '832 patent) issued to Hagenbuch on May 20, 1997. The '832 patent discloses a computer that cumulatively records ton-mile per hour data over a given time frame. As a vehicle accumulates ton-mile per hour figures, the cumulative figures for all trucks are compared, and the trucks with excessive ton-mile per hour numbers can be dispatched to locations from which less ton-mile per hour figures occur.

Additionally, the computer as well as vehicle sensor processing units may analyze vehicle component strain, such as engine operating temperature, hydraulic oil temperature, heat buildup in the tires, etc. As a particular component on a vehicle approaches a preset limit, the vehicle may be dispatched to a haul that may be less trying on the vehicle (e.g., in a mine with a multi-bench, operation vehicles may be rotated so that no one vehicle is continually hauling off of the lowest bench).

Although the apparatus and method of '832 patent may use TMPH calculations to reduce tire wear, they may still be problematic. For example, in cases where multiple machines are needed to haul on a single route, it may not be possible or practical to dispatch a high TMPH vehicle to another location (e.g., another location may not exist and/or the machines may not be interchangeable).

The disclosed machine system is directed to overcoming one or more of the problems set forth above.

SUMMARY

In one aspect, the present disclosure is directed to a control system for a machine with traction devices. The control system may include a sensor configured to sense an ambient temperature. The control system may also include a controller in communication with the sensor. The controller may be configured to determine a load limit of a machine based on an expected speed of the machine and the ambient temperature. The controller may further be configured to enforce the load limit of the machine during loading.

In another aspect, the present disclosure is directed to a method of mobile machine control. The method may include measuring an ambient temperature. The method may also include determining a load limit of a mobile machine based on an expected speed of the mobile machine and the ambient temperature. The method may further include enforcing the load limit of the mobile machine during loading.

In yet another aspect the present disclosure is directed to a method of mobile machine control. The method may include loading a mobile machine with a load and measuring an ambient temperature. The method may also include determining a road characteristic. The method may further include modifying a load limit of the mobile machine based on the ambient temperature and the road characteristic.

DETAILED DESCRIPTION

Figure 1:
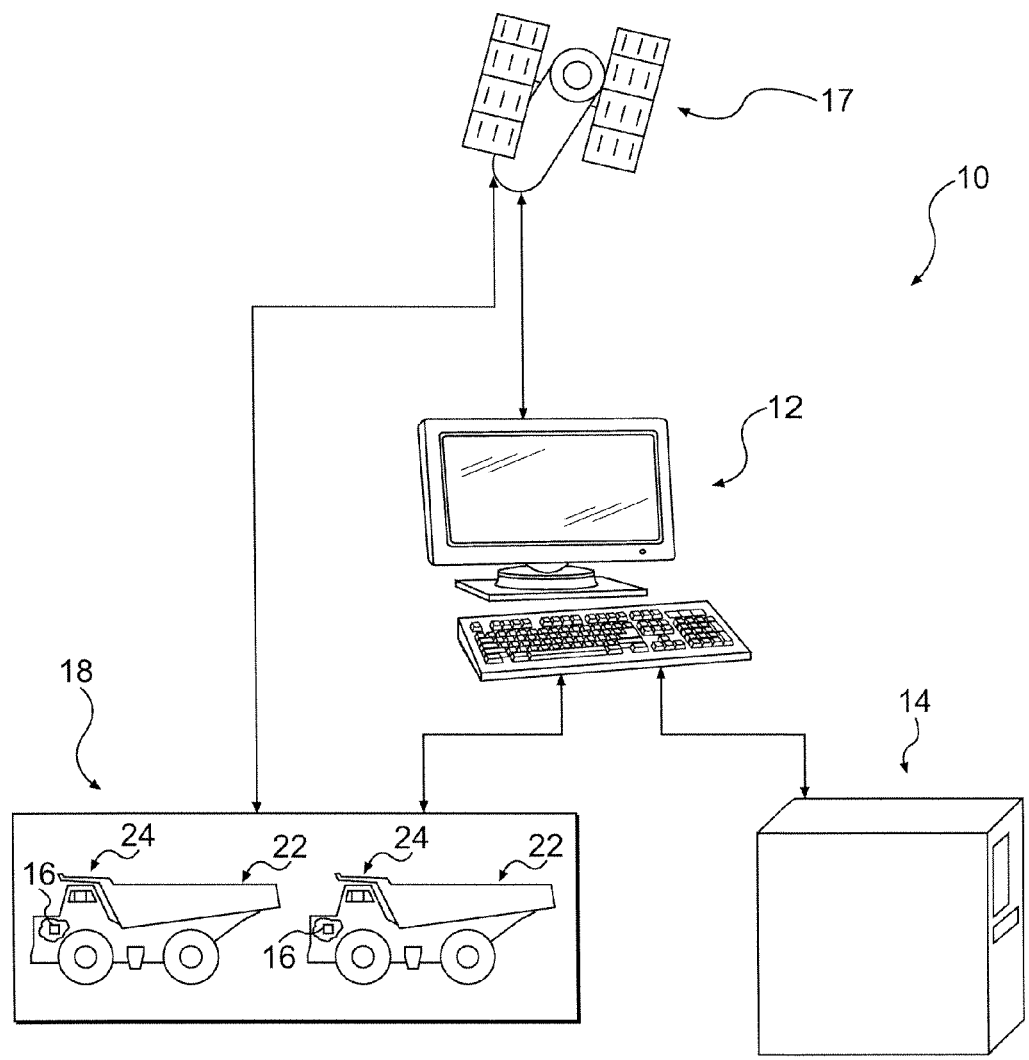
FIG. 1 is a diagrammatic illustration of an exemplary disclosed control system.

FIG. 1 illustrates an exemplary control system 10. Control system 10 may be configured to control a material hauling operation. Specifically, control system 10 may be configured to control the material hauling operation such that high productivity is achieved while limiting costs associated with material hauling equipment. The material hauling operation may be associated with, for example, a mine, a construction site, a factory, etc. Control system 10 may include one or more systems or components that help perform the material hauling operation. For example, control system 10 may include a controller or central computer 12, a database 14, a positioning system 16, and a plurality of machines 18.

Central computer 12 may compute information related to the material hauling operation and relay information between database 14, positioning system 16, and machines 18. Central computer 12 may be, for example, a server or any other appropriate computer. Central computer 12 may include a memory, a secondary storage device, a processor, and any other components for running an application. It is contemplated that central computer 12 may be located at a dispatching location. A user may input dispatching directions into central computer 12 that may be relayed to machines 18. It is also contemplated that dispatching may be fully or partially automated.

Database or data source 14 may include information related to the material hauling operation. The information may include, for example, haul route locations, weather conditions, weather forecasts, haul route conditions, and other relevant information. It is contemplated that central computer 12 may save and/or retrieve information from database 14. Database 14 may include, for example, an internet-based database, an intra-net database, a database located on an internal and/or external drive of central computer 12, or any other appropriate information source.

Positioning system 16 may be configured to determine a geographical position of machines 18. Positioning system 16 may embody, for example, a global positioning system (GPS), a laser-based positioning system, a radio-frequency based positioning system, or any other positioning system or device known in the art. Positioning system 16 may communicate with one ore more external references or positioning devices 17 (e.g., satellites, radio towers, laser emitters/receivers, etc.). It is contemplated that each machine 18 may include a positioning system 16.

Figure 2:
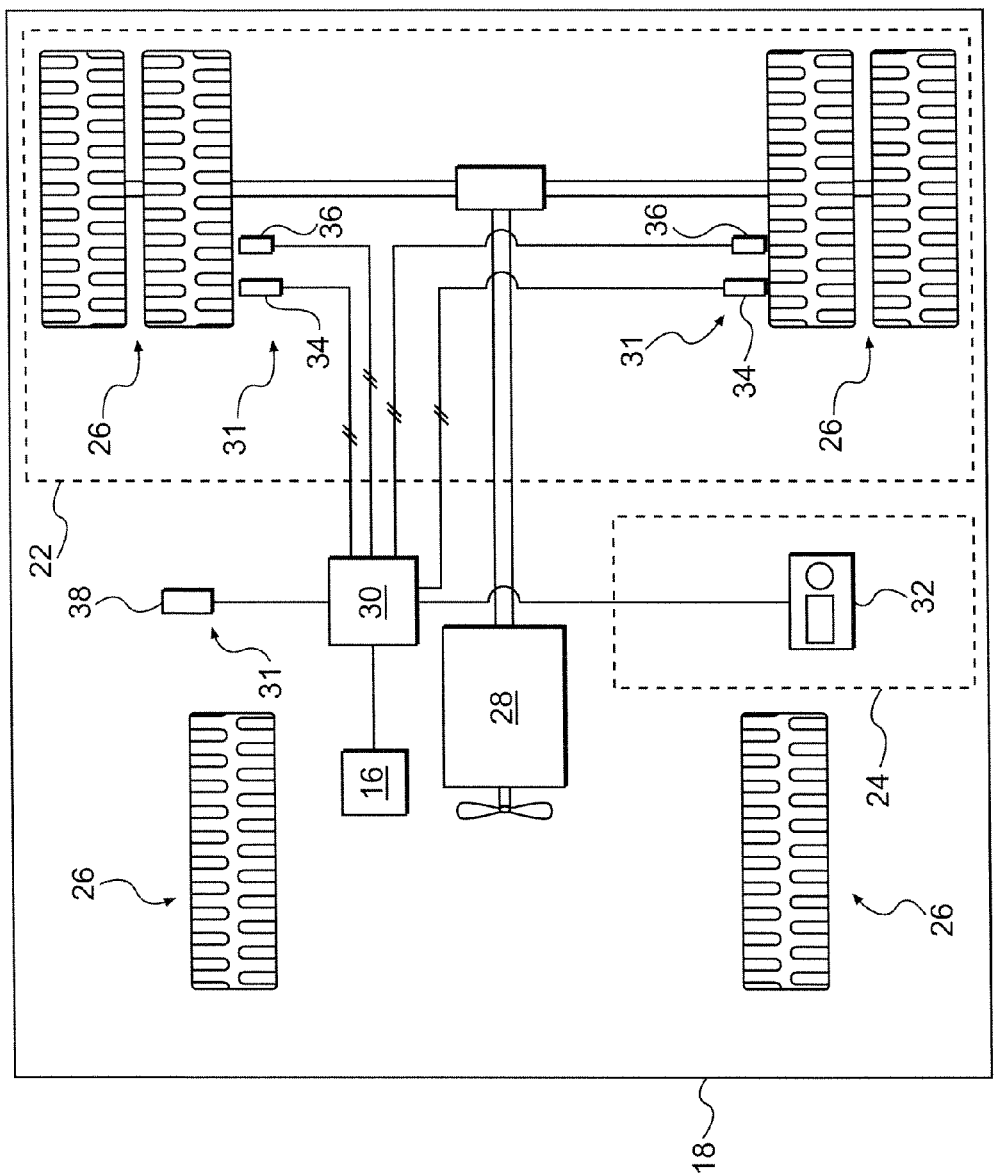
FIG. 2 is a diagrammatic illustration of a mobile machine that may be used with the control system of FIG. 1.
Figure 3:
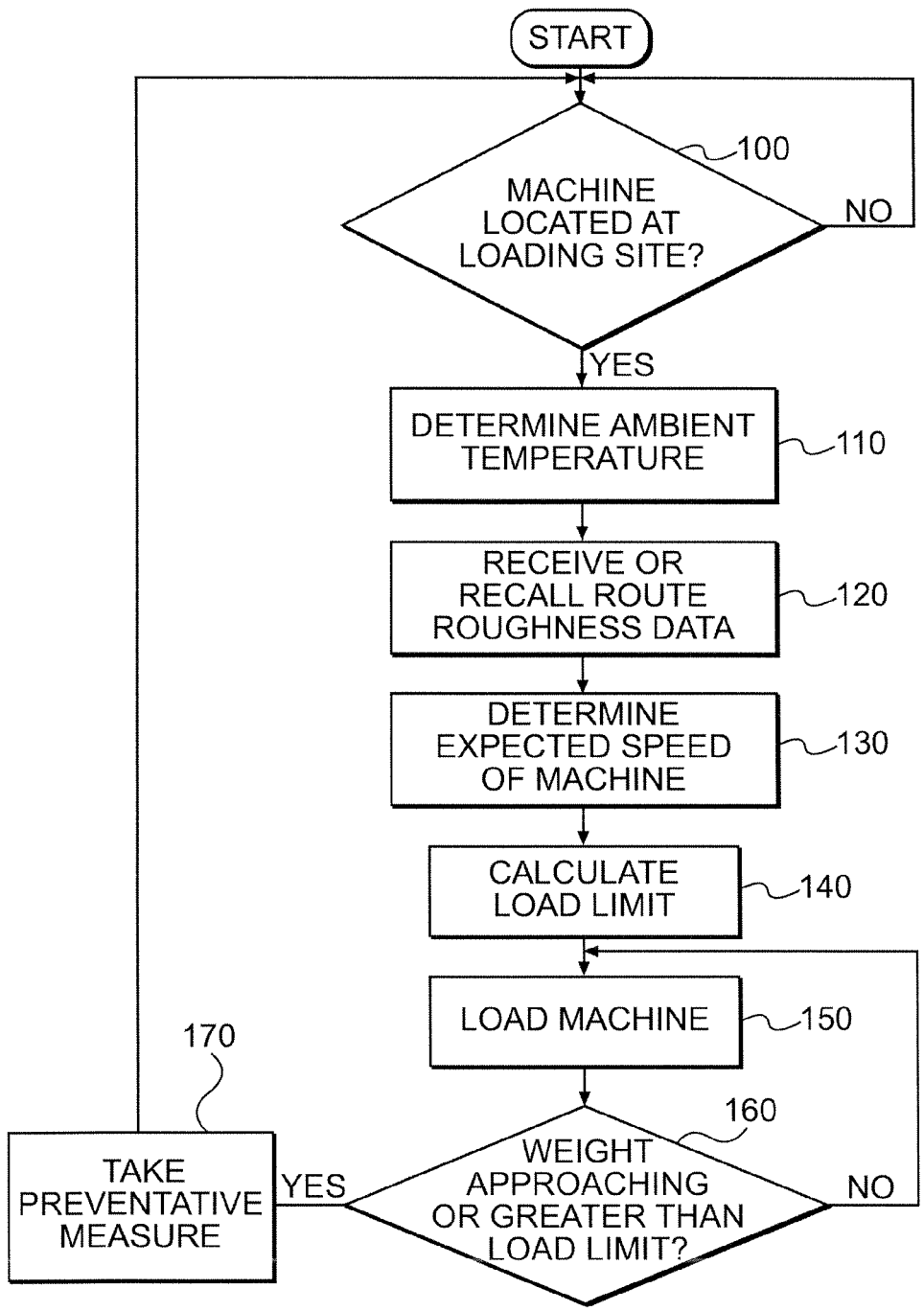
FIG. 3 is a flowchart depicting an exemplary operation of the control system illustrated in FIG. 1.

FIG. 2 illustrates an exemplary machine 18. Each machine 18 may be a mobile machine that performs some type of operation associated with an industry such as mining, construction, farming, transportation, or any other industry known in the art. For example, machine 18 may be an earth moving machine, such as an on- or off-road haul truck, a wheel loader, an excavator, a backhoe, or any other suitable earth moving machine known in the art. Each machine 18 may include a haulage portion 22 and an operator station 24 (also see FIG. 1). Each machine 18 may also include one or more traction devices 26, a power source 28, a processing device 30, and one or more sensors 31.

Haulage portion 22 may be a structure configured to carry a payload, such as, for example, a dump bed, a bucket, or any other appropriate structure known in the art. Haulage portion 22 may connect to a body of machine 18 via one or more linkages, pivots, and/or actuators (not shown).

Operator station 24 may be a location from which an operator may control machine 18. Operator station 24 may include one or more operator input devices (not shown). Operator station 24 may also include an operator display 32 that provides information regarding the operation or performance of machine 18. It is contemplated that operator display 32 may include audio and/or visual devices.

Traction devices 26 may embody tires coupled to machine 18 and configured to allow translational motion of machine 18. For example, traction devices 26 may embody at least one front left tire, at least one front right tire, at least one left rear tire, and at least one right rear tire. Alternatively, traction devices 26 may embody tracks, belts, or other traction devices known in the art. Any of traction devices 26 may be driven and/or steerable.

Power source 28 may provide power for the operation of machine 18. Power source 28 may embody a combustion engine, such as a diesel engine, a gasoline engine, a gaseous fuel powered engine (e.g., a natural gas engine), or any other type of combustion engine known in the art. Power source 28 may alternatively embody a non-combustion source of power, such as a fuel cell or other power storage device coupled to a motor. Power source 28 may provide a rotational output to drive traction devices 26, thereby propelling machine 18.

Processing device 30 may control one or more operations of machine 18. Processing device 30 may embody a single microprocessor or multiple microprocessors. Numerous commercially available microprocessors may be configured to perform the functions of processing device 30, and it should be appreciated that processing device 30 may readily embody a general machine microprocessor capable of monitoring and/or controlling numerous machine functions. Processing device 30 may include a memory, a secondary storage device, a processor, and any other components for running an application. Various other circuits may be associated with processing device 30, such as, for example, power supply circuitry, signal conditioning circuitry, data acquisition circuitry, signal output circuitry, signal amplification circuitry, and other types of circuitry known in the art. It is contemplated that processing device 30 may communicate with a speed sensor 34, one or more force sensors 36, and a temperature sensor 38.

Speed sensor 34 may be, for example, a magnetic pick up sensor, a rotary encoder, a tachometer, a radar based sensor, or any other type of sensor configured to produce a signal corresponding to a machine travel speed.

Force sensors 36 may be configured to measure a force acting on or transmitted through traction devices 26. Specifically, force sensors 36 may sense a pressure, a force, or a torque created by the weight of machine 18, an output of power source 28, and/or the weight of the payload in haulage portion 22. Force sensors 36 may embody, for example, piezoelectric transducers, strain gauges, capacitive sensors, and any other sensors known in the art. Force sensors 36 may alternatively embody displacement sensors, wherein a given displacement is indicative of a known force. Force sensors 36 may be located at, for example, traction device struts (not shown), one or more haulage portion linkages or hydraulic cylinders (not shown), or any other suitable location. It is contemplated that force sensors 36 may be used when machine 18 is traveling to sense forces, or displacements that may be related to forces, due to rough road conditions. The rough road conditions may be caused by, for example, washboard, potholes, rocks, obstacles, etc. The force sensor data may be saved in processing device 30 and/or central computer 12.

Temperature sensor 38 may embody a thermocouple, a thermometer-type sensor, or any other appropriate sensor known in the art configured to measure an ambient temperature. Temperature sensor 38 may be located at machine 18 and may measure the ambient temperature at or near any machine 18. Temperature sensor may alternatively or additionally be located and configured to measure the ambient temperature at the routes or locations associated with the material hauling operation. It is contemplated that processing device 30 may communicate data from sensors 31 to central computer 12 to help control the hauling operation.

Processing device 30 and/or central computer 12 may be programmed with a limit on a quantity related to the traction device temperature (e.g., a TMPH limit). The TMPH limit or $TMPH_{max}$ may be set by an operation supervisor or machine technician. The TMPH limit may be based on information obtained, for example, from a TMPH study. It is contemplated that the TMPH limit may be set for a group of traction devices 26 or alternatively the TMPH limit may be set for each of traction devices 26 independently (i.e., a TMPH may be calculated for each tire).

It is contemplated that the material hauling operation may include a dispatching or loading site, one or more haul routes, and an unloading site. Control system 10 may be configured to, amongst other things, control the material hauling operation to maintain high productivity while preventing excessive wear of traction devices 26. Specifically, control system 10 may control machines 18 such that an actual TMPH for the traction devices 26 of each machine 18 generally remains below the TMPH limit for that machine 18. Control system 10 may control TMPH by modifying a load limit, $F_{max}$, of each machine 18 so that a predicted TMPH of each machine 18 may not violate the TMPH limit.

The load limit may be the maximum weight of material that machine 18 may receive in a load without a predicted violation of the TMPH limit. If the load limit is exceeded during loading of machine 18, processing device 30 may take a preventive measure. Preventative measures may include, for example, sending an audio and/or visual signal via operator display 32, sending a signal to central computer 12, regulating or inhibiting operation of power source 28, and other preventative measures known in the art.

Central computer 12 may modify or control the load limit of machines 18 using one or more maps. Each of these maps may include a collection of data in the form of tables, graphs, and/or equations. An exemplary map for determining the load limit may be given by:

$$F_{max} \propto \frac{TMPH_{max}}{S \cdot \alpha(T) \cdot \beta(R)} \quad (2)$$

where, S is a desired or expected speed of machine 18, β is a unitless scaling factor, and α is a unitless scaling factor. The maps may be stored within an internal memory of processing device 30 and/or central computer 12. It is contemplated that either the β or α may be omitted.

It is contemplated that α may be a function of an ambient temperature T. Lower temperatures may occur during night time hauls or during the winter months and may result in more heat transferred from traction devices 26. Higher heat transfer away from traction devices 26 may allow traction devices 26 to sustain higher loads. Thus, the value of α may increase for higher ambient temperatures and may decrease for lower ambient temperatures. The ambient temperature may be measured using temperature sensor 38 of a given machine or using an average of temperature sensor measurements from all machines 18. It is also contemplated that the current temperature and/or future forecasted temperatures may be obtained from database 14 and used to calculate α.

β may be a function of a route roughness R. R may be determined using force sensor data received while one or more machines 18 are traveling the haul routes. R may be related to, for example, a frequency and/or a magnitude of the forces measured by force sensors 31 of one or more machines 18 while machines 18 are traveling the haul routes. The value of β may increase as the magnitude and/or frequency of forces measured by force sensors 31 increases, and the value of β may decrease as the magnitude and/or frequency of forces measured by force sensors 31 decreases. The value of R may be continuously updated. Continuous updating may be useful since the route conditions may change frequently. It is contemplated that central computer 12 may alternatively determine route roughness using surveys or other publicly available data on database 14. Roughness data may be associated with specific routes using position information from positioning system 16.

Central computer 12 may set the expected speed, S, for machines 18 such that the material hauling operation is not substantially slowed by any one machine 18. For example, central computer 12 may set the expected speed S to be equal to a speed limit for a particular route. The speed limit may be set by an operation supervisor or in any other appropriate manner. Central computer 12 may alternatively determine the expected speed, S, for machines 18 based on past and/or present maximum speeds achieved by machines 18 while traveling the haul routes. To help determine the S for a given machine based on the past and/or present maximum speeds achieved by machines 18, central computer 12 may use data from positing system 16. Central computer 12 may alternatively or additionally use data from speed sensor 34 to determine the speed of each machine 18. Central computer 12 may set the expected speed S to be equal to the maximum speed of one or more machines 18. Central computer 12 may also store speed trends for each machine or an average speed trend of multiple machines 18.

INDUSTRIAL APPLICABILITY

The disclosed control system may be applicable to any machine where reduction of traction device wear is desired. Specifically, the disclosed control system may reduce traction device wear while still allowing high machine travel speeds and high productivity. The operation of control system 10 will now be described.

In an exemplary operation, a machine may receive material at a loading site of a mine. The machine may then be dispatched to carry the material to an unloading site via one or more mine routes. After unloading the material at the unloading site, the machine may then return to loading site to receive another load of material. It is contemplated that multiple machines may be performing the material hauling operation, and thus a machine with a travel speed lower than the other machines may slow the loading operation (especially in cases of single-track or one-lane routes that may be encountered in a mine).

Referring to FIG. 4, central computer 12 may determine if a first machine (i.e., a machine 18) is located at the loading site and is preparing to load with material (step 100). Processing device 30 may determine that the first machine is preparing to load by, for example, communicating with positioning system 16 and determining if the first machine is located at a loading site. It is also contemplated that an operator of the first machine or user of central computer 12 may indicate loading (e.g., determined via a signal from the an operator input device).

Central computer 12 may then determine an ambient temperature (step 110). For example, central computer 12 may communicate with temperature sensor 38 of the first machine and receive ambient temperature data. Using the measured temperature data, central computer 12 may determine the scaling factor α. In the exemplary operation, the first machine may be hauling during the winter months, and thus the value of α may decrease so that the first machine may carry a larger load. It is contemplated that central computer 12 may alternatively or additionally use temperature data from temperature sensors 38 of other machines 18.

Central computer 12 may receive or recall information regarding route roughness (step 120). For example, each machine involved in the hauling operation may communicate data from force sensors 36 to central computer 12. The data may include the frequency and/or magnitude of forces caused by, for example, washboard, potholes, rocks, and obstacles encountered while the first machine or other machines are traveling the haul routes. Central computer 12 may use this route roughness information to calculate a scaling factor β. It is contemplated that central computer 12 may determine that the first machine is traveling on the routes by communicating with positioning system 16. In the exemplary operation, the first machine (and other machines) may be traveling on relatively smooth haul routes. This may result in only small force measurements and thus a smaller value of β for a particular route.

Central computer 12 may then determine the expected speed for the first machine (step 130). For example, central computer 12 may determine the expected speed, S, for the first machine based on the speed limit (or speed limits) of the routes. The speed limit may be set by an operation supervisor or in any other appropriate manner. Central computer 12 may alternatively determine the expected speed, S, for the first machine based on past and/or present maximum speeds achieved by the first machine or other machines while traveling the routes.

After determining S, α, and β, central computer 12 may calculate the load limit $F_{max}$ for the first machine (step 140). The β used for calculating the load limit may be the β associated with the particular haul route or routes that the first machine will travel per the dispatch. The load limit $F_{max}$ may be calculated using, for example, a TMPH-based equation, such as Equation 2. Central computer 12 may then command that loading commence (step 150).

While the first machine is loading, central computer 12 may communicate with force sensors 36 of the first machine to determine if a current weight is approaching (e.g., within a certain percentage of) or has exceeded the load limit $F_{max}$ imposed by central computer 12 (step 160). The current weight may include the weight of the first machine and/or the weight of the payload. If the current weight is not approaching or has not exceeded the load limit, central computer 12 may return to step 150. If the current weight is approaching or has exceeded the load limit, central computer 12 may take a preventative measure (step 170). For example, central computer 12 may communicate with a loading machine (for cases where material is loaded onto the first machine using a loading machine), an operator of the loading machine, and/or an operator of the first machine to command a stop to the loading process. Central computer 12 may command a stop to the loading process by sending a message via operator display 32 or another appropriate device indicating that the current weight is approaching or has exceeded the load limit and loading should be discontinued. Operator display 32 may use both visual and auditory means to convey the message. After enforcing the load limit (i.e., steps 160 & 170), central computer 12 may then return to step 100 (steps 100-170 may be performed for all machines 18 involved in the material hauling operation when they arrive at the loading site).

It should be noted that any of the calculations, processing steps, or operations performed by central computer 12 may alternatively be performed by processing device 30 or any other appropriate computing device. It should also be noted that steps 110-140 may be performed for any particular machine 18 at any time during the material hauling operation.

Several advantages of the disclosed control system may be realized. In particular, the disclosed control system may reduce traction device wear while still allowing high machine travel speeds. Allowing high travel speeds may prevent bottlenecks in operations where multiple machines operate in a series-type operation (i.e., an operation where the operation speed of one machine is dependent on the operation speed of another machine).

It will be apparent to those skilled in the art that various modifications and variations can be made to the disclosed control system without departing from the scope of the disclosure. Other embodiments of the control system will be apparent to those skilled in the art from consideration of the specification and practice of the control system disclosed herein. It is intended that the specification and examples be considered as exemplary only, with a true scope being indicated by the following claims.

What is claimed is:

1. A control system for a machine with traction devices, comprising:
    a sensor configured to sense an ambient temperature; and
    a controller in communication with the sensor, wherein the controller is configured to:
        determine a load limit of a machine relating to traction device wear based on an expected speed of the machine and the ambient temperature; and
        enforce the load limit of the machine during loading by commanding a stop to the loading.

2. The control system of claim 1, further including an operator display, wherein the operator display is configured to provide at least one of an auditory or visual message when the current load of the machine is above the load limit.

3. The control system of claim 1, wherein the sensor is a first sensor, and further including a second sensor configured to sense a road characteristic, wherein the controller is configured to determine the load limit based on the expected speed, the ambient temperature, and the road characteristic.

4. The control system of claim 3, wherein the second sensor is a force sensor and the characteristic is at least one of a magnitude of a force or a frequency of a force measured by the force sensor.

5. The control system of claim 3, wherein the second sensor is a displacement sensor, where the characteristic is at least one of a magnitude of a displacement or a frequency of a displacement measured by the displacement sensor.

6. The control system of claim 3, wherein the controller includes:
    a ton-miles-per-hour map; and
    a ton-miles-per-hour limit, wherein the controller is configured to use the ton-miles-per-hour map and the ton-miles-per-hour limit to determine the load limit.

7. The control system of claim 3, wherein the machine is a first machine and the first sensor and the second sensor are located on the first machine, and wherein the controller is further configured to:
    determine a load limit of a second machine based on the ambient temperature and the road characteristic sensed by the first sensor and the second sensor located on the first machine; and
    enforce the load limit of the second machine during loading of the second machine.

8. The control system of claim 3, further including a positioning system, wherein the controller receives information from the first sensor and the second sensor when the positioning system indicates that the machine is traveling.

9. A method of mobile machine control, comprising:
    determining when a mobile machine is located at a loading site;
    measuring an ambient temperature with a temperature sensor;
    determining an expected speed of the mobile machine;
    prior to loading, determining a load limit of the mobile machine relating to traction device wear with a controller based on the expected speed of the mobile machine and the ambient temperature which is received from the temperature sensor; and
    enforcing the load limit of the mobile machine during loading with the controller by commanding a stop to the loading.

10. The method of claim 9, further including determining a road characteristic with a second sensor, wherein determining the load limit of the mobile machine is based on the expected speed of the mobile machine, the ambient temperature, and the road characteristic.

11. The method of claim 10, wherein the mobile machine is a first mobile machine and the measuring step occurs on at least one of the first mobile machine or a second mobile machine.

12. The method of claim 11, wherein a magnitude of the load limit decreases as the ambient temperature increases and the magnitude of the load limit increases as the ambient temperature decreases.

13. The method of claim 10, wherein the mobile machine is a first mobile machine and the road characteristic is indicative of at least one of a magnitude of a force and a frequency of a force measured by a force sensor located on at least one of the first mobile machine or a second mobile machine.

14. The method of claim 13, wherein a magnitude of the load limit increases as at least one of the magnitude of the force or frequency of the force increases and the magnitude of the load limit decreases as at least one of the magnitude of the force or frequency of the force decreases.

15. The method of claim 10, wherein determining the load limit is additionally based on a ton-miles-per-hour map and a ton-miles-per-hour limit.

16. The method of claim 9, further including taking a preventative measure when the current load of the mobile machine is above the load limit.

17. The method of claim 16, wherein the preventative measure includes displaying at least one of an auditory or visual message.

18. A control system for improving tire wear and machine productivity, comprising:
    a temperature sensor located on a first mobile machine configured to sense an ambient temperature;
    a speed sensor located on a second mobile machine configured to measure a speed of the second mobile machine; and
    a controller configured to receive the ambient temperature from the temperature sensor and the speed of the second mobile machine from the speed sensor, wherein the controller is configured to:
        determine that the first mobile machine is located at a loading site;
        determine an expected speed based on the speed of the second mobile machine;
        prior to loading, determine a load limit of the first mobile machine relating to traction device wear based on the expected speed and the ambient temperature; and
        enforce the load limit of the first mobile machine during loading by commanding a stop to the loading.

19. The control system of claim 18, further including a sensor on the second mobile machine configured to sense a road characteristic, wherein the controller is configured to receive the sensed road characteristic and determine the load limit based on the expected speed, the ambient temperature, and the road characteristic.

20. The control system of claim 19, wherein the controller includes:
    a ton-miles-per-hour map; and
    a ton-miles-per-hour limit, wherein the controller is configured to use the ton-miles-per-hour map and the ton-miles-per-hour limit to determine the load limit.

* * * * *